Figure 1:
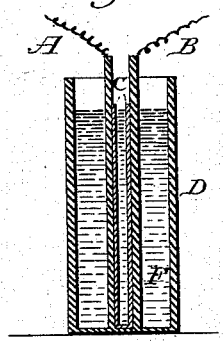

(No Model.)

C. A. FAURE.
POLARIZATION OR SECONDARY ELECTRIC BATTERY.

No. 252,002. Patented Jan. 3, 1882.

Fig. 3 bis.

Witnesses:
C. J. Hedrick
Philip Mauro

Inventor:
Camille Alphonse Faure
by A. Pollok
his attorney

UNITED STATES PATENT OFFICE.

CAMILLE A. FAURE, OF PARIS, FRANCE, ASSIGNOR TO SOCIÉTÉ ANONYME LA FORCE ET LA LUMIÈRE, OF BRUSSELS, BELGIUM.

POLARIZATION OR SECONDARY ELECTRIC BATTERY.

SPECIFICATION forming part of Letters Patent No. 252,002, dated January 3, 1882.

Application filed April 20, 1881. (No model.) Patented in France October 20, 1880.

*To all whom it may concern:*

Be it known that I, CAMILLE A. FAURE, of Paris, in the Republic of France, have invented a certain new and useful Improvement in Polarization or Secondary Electric Batteries, of which improvement the following specification is a full description.

This invention relates to that class of batteries which give no electricity of themselves, but which, being included for a time in circuit with a source of electricity—an ordinary galvanic battery, for example—absorb electricity, so to say, or become charged, so that they subsequently give out electricity on the completion of a proper circuit, and can thus be used like a reservoir of electricity.

The secondary batteries of Mr. Gaston Planté are well known. They consist generally of leaden plates or electrodes immersed in an electrolytic liquid composed of a ten per cent. solution of sulphuric acid in water, the said plates or electrodes having their capacity for accumulating electric energy increased by rendering their surfaces more or less porous through successive charges and discharges of electricity, this operation being called by Mr. Planté and generally known as the "formation" of the plates. The operation is, however, long and expensive, and the accumulating or absorptive capacity obtained is limited not only by the thickness of the plates, but also by the cohering power of the particles composing the porous layer, so that as the said particles spontaneously become detached when the layer reaches a certain depth, the active layer is in practice quite thin, even where thick plates are used, and the industrial application of the secondary batteries prevented or much limited in consequence.

In the present invention the difficulties mentioned are overcome and a rapid construction of the electrodes with an unlimited accumulating power is obtained. The electrodes are made, not by the formation of disintegrated or porous layer in the body of metallic plates, but by the addition or application of a layer of an active material—metal, metallic oxide or salt—which layer is or at once becomes porous or spongy, to suitable plates or supports, which may be of suitable non-metallic substance as well as of metal. This active material may be applied in various ways, so as to obtain a layer of the desired depth, as in the form of paint, paste, or cement, in the form of a deposit by galvanic action or chemical precipitation, or otherwise.

In order to render the active layer more porous, the material composing it has preferably inert material—such, for example, as crushed coke—mixed with it. The active layer is retained in position upon the support by means of an open-work, perforate, or porous medium or partition, which, while allowing free percolation of the electrolytic liquid, prevents the active material from separating either spontaneously or by the slight jarring to which it is liable to be subjected. The retaining medium or partition is made of material which is not liable to be acted upon by the electrolyte used—for example, of felt, cloth, asbestus paper or board, netting of cane, gutta-percha, or caoutchouc, wire-cloth, of lead or other suitable metal, porous earthenware, and the like. When desired the space between the two plates or electrodes of a cell can be occupied by porous material, which will retain the active layers of both electrodes in place.

When the batteries are to be transported the retaining medium or partition is fastened to the support or body of the electrode, so that the active layer will not be detached, even with considerable handling. The fastening can be made by rivets, cement, or winding with woolen or cotton yarn, or otherwise. This portion or these portions of the invention—to wit, the retention of the active layer on the electrodes in secondary batteries by means of an open-work, perforate, or porous medium or partition, and the secure fastening of the said medium or partition—are applicable to batteries having plates formed on the Planté system.

Secondary batteries, like ordinary galvanic batteries, can be made with a series of cells side by side, or one above the other, with the intermediate walls common to the two adjacent cells. In making such batteries it is advantageous, and in some cases essential, to apply a non-porous partition of rubber or other suitable substance to the plates, so as to cut off all communication between the cells. This combination of non-porous diaphragms with the electrodes in such secondary batteries constitutes a portion of the invention.

The invention further comprises a particular form of battery, composed of a series of parallel plates separated from one another by strips of rubber or similar material and clamped together, so as to dispense with a separate containing-vessel, as hereinafter described.

In order to enable the invention to be fully understood, several forms of batteries constructed in accordance with the invention will now be described by aid of the accompanying drawings, which form a part of this specification.

Figure 2:
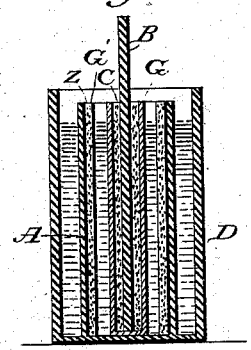
Figure 3:
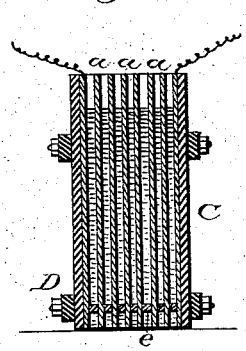
Figure 5:
Figure 4:
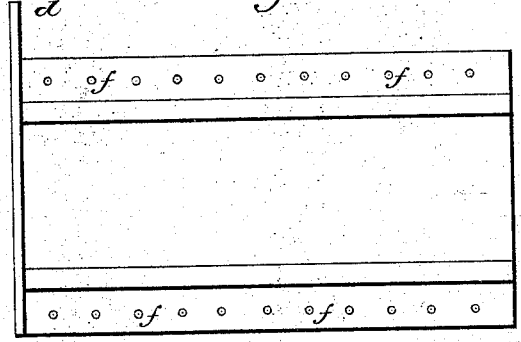

Figures 1 and 2 are views in vertical section of single cells, the cell shown in Fig. 2 being provided with porous media for retaining the active layer on the electrodes, and that in Fig. 1 being without such media. Figs. 3 and 3$^{bis}$ are views, respectively in vertical cross-section and in end elevation, of a battery formed of a series of plates, without requiring any inclosing-vessel. Figs. 4 and 5 are an elevation and cross-section, respectively, of an electrode adapted to be rolled into a spiral; and Fig. 6, a cross-section of an electrode with non-porous partition, having the prepared plates secured on both sides, and adapted for use in a battery with series of adjacent cells—such, for example, as shown in Figs. 3 and 3$^{bis}$.

The cell shown in Fig. 1 consists of two parts, A B, formed each of a thin plate of lead covered with a porous metallic coating, C, and placed in a rectangular vessel, D, containing an electrolytic liquid, F, of, say, sulphuric acid and water. The porous metallic coating may be made of lead, or an oxide or salt of lead applied to the lead plates in any suitable way. In Fig. 2 a circular cell is shown, one electrode being inclosed in the other. The rod B, of lead or carbon, is placed in a porous vessel, G, and is coated with the active accumulating or absorbing material C, say sulphate of lead mixed thoroughly with coarse coke, sawdust, or other material adapted to make the mass more porous. The other electrode consists of a piece of lead, A, with its inner face covered by a paste or mixture, Z, of sulphate of lead and coke or equivalent material, which is held in place by a porous medium or partition, G'. A suitable space is left between the partition G' and the vessel G for the electrolytic liquid. D is the containing-vessel.

The battery shown in Figs. 3 and 3$^{bis}$ has a number of elements connected in tension. Plates of lead, $a$, having a surface of, say, a square yard, are placed parallel with strips $e$, of rubber, between every two plates, arranged as shown in dotted lines, Fig. 3$^{bis}$, so as to form the bottom and ends of narrow cells, and the said plates are clamped between two outer plates by means of cross-pieces H and bolts. A series of cells are thus formed, the bottom and ends being formed by the strips $e$ and the sides by the plates $a$. The cells are filled to the desired height with the electrolytic liquid and the wires or conductors are connected with the end plates. The plates $a$ can be coated with an active porous layer in any suitable way, and the space between the plates can be filled with felt or other inert porous substance, as coke, sand, and the like. The edges of the plates are insulated by painting with shellac (gum lac) or otherwise.

The electrode shown in Figs. 4 and 5 consists of a support, $a$, covered on both sides with a layer of lead oxide, $c$, held in place by sheets of felt, $b$, fastened by rivets, $f$, of lead. Two electrodes such as just described can be rolled together in the form of a spiral, and immersed in an electrolytic liquid in a cylindrical or other suitably-shaped vessel. The part $d$, covered with gutta-percha in order to resist the action of the acid, serves as a conductor for conveying electricity to and from the plate. Strips of gutta-percha, woolen or cotton yarns, or other suitable material should be interposed between the sheets or electrodes to give space for the escape of the gases.

When the supporting plates or bodies are to be placed either parallel or in any other position permitting of their being distorted by a mechanical strain, sufficient stiffness may be imparted to the leaden plates or supports by applying them on wood or hard-rubber boards, or any other rigid support. For instance, in the battery with parallel plates (shown in Figs. 3 and 3$^{bis}$) any of the leaden plates would be formed of two superposed plates, each of which should be coated and covered as above described, these plates being separated by a conducting or non-conducting but non-porous board, so as to prevent any liquid passing from one cell to the other. The boards of these compound supports or bodies have edges fitted with india-rubber—such as the strips $e$, shown in Figs. 3 and 3$^{bis}$—in order to render the cells perfectly liquid-tight, as above explained.

Figure 6:
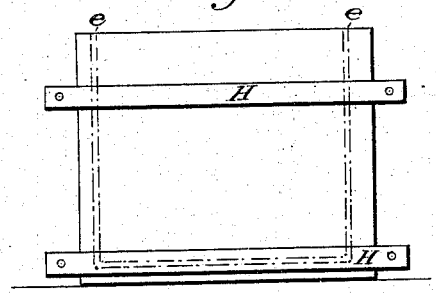
Figure 6:

Fig. 6 shows the arrangement of parallel plates formed with an interposed wooden board, $x$. This arrangement permits of employing thin sheets of lead, while securing at the same time sufficient stiffness, and affording means of firmly securing the parts $x$ without any leakage between the adjacent cells formed on each side of the leaden plate $a$. The parts $x$ may be made of wood, hard rubber, or even metal.

The improved battery constructed as above described, although of small size, permits the absorption and storage of a considerable amount of electric energy.

The cells or batteries constructed as described are charged by including them in circuit with a suitable source of electricity, and, when charged, the electric energy stored up is taken off by conductors, as from an ordinary galvanic battery. In charging, the electricity acts to produce a reduced mass of porous lead on one electrode and a mass of peroxide of lead on the other. When the battery is discharged the reduced lead becomes oxidized, and the peroxidized lead is reduced until the equilibrium is restored. When again connected with a source of electricity the oxidized lead on one electrode is again reduced and the lead on the other is again peroxidized, and the battery becomes charged ready to give out a current when required.

The oxides or salts of lead not soluble in the electrolytic liquid are deemed the most advantageous for covering the supports of the electrodes. The invention is not, however, limited to these, but includes generally substances capable of absorbing or storing electric energy in the manner described—for example, manganese or any salt the oxide of whose base is insoluble.

In preparing the batteries, especially when a salt is used, as lead sulphate, it is well to charge them twice with currents of opposite polarity, so as to reduce the salt on both sides.

In place of using dilute sulphuric acid as the electrolytic liquid, a solution of an alkaline earthy salt or other salt, or other suitable electrolytic liquid, can be used.

Having now fully explained my said invention and the manner of carrying the same into effect, what I claim is—

1. As an improvement in secondary batteries, an electrode consisting of a support coated on one or more faces with an active layer of absorptive substance—such as metal or metallic compound applied thereto in the described condition—so as to be or instantly become spongy, and thus capable of receiving and discharging electricity, as stated, in contradistinction to a metallic plate itself rendered spongy by the disintegrating action of electricity, substantially as and for the purpose set forth.

2. In a secondary battery, an electrode having a plate or support coated with an active porous layer of metal or metallic compound, with inert material—such as crushed coke—mixed or incorporated therewith, substantially as described.

3. In combination with the plate or support of an electrode and active spongy layer thereon, an open-work, perforate, or porous medium for holding said layer on the plate or support of the electrode, substantially as described.

4. In a secondary battery, a series of cells, comprising each a pair of electrodes with an active spongy layer thereon, combined with non-porous partitions between adjacent cells, substantially as and for the purpose set forth.

5. An electrode for secondary batteries, comprising a support, an active spongy layer of metallic substance, and a holding medium through which the battery-fluids may pass, adapted to hold said layer on said support, said support, layer, and holding medium being all fastened together, so as to be capable of transportation, substantially as described.

6. A battery comprising a series of plates clamped together with strips of rubber or like material placed between every two plates near the edges, so as to form the bottom and ends of narrow troughs or cells with open tops, the sides of the troughs or cells being formed by the plates, and the latter being clamped firmly, so that liquid-tight joints are formed, substantially as described, the projecting edges of the plates, when metallic, being protected by insulation, substantially as described.

CAMILLE ALPHONSE FAURE.

Witnesses:
   ROBT. M. HOOPER,
   JEAN BAPTISTE ROLLAND.